(12) United States Patent
Kwok (10) Patent No.: US 6,462,511 B1
(45) Date of Patent: Oct. 8, 2002

(54) PSEUDO-PARALLEL CHARGING SYSTEMS AND METHODS

(75) Inventor: Wellington Y. Kwok, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/722,859

(22) Filed: Nov. 27, 2000

(51) Int. Cl.[7] .............................................. H01M 10/46
(52) U.S. Cl. ...................................... 320/119; 320/141
(58) Field of Search ................................ 320/116, 119, 320/120, 122, 140, 141

(56) References Cited

U.S. PATENT DOCUMENTS

| | | | |
|---|---|---|---|
| 3,928,791 A | * | 12/1975 | Mullersman |
| 3,930,192 A | * | 12/1975 | Dinkler |
| 5,780,991 A | * | 7/1998 | Brake et al. |
| 6,181,106 B1 | * | 1/2001 | Finger |

* cited by examiner

Primary Examiner—Edward H. Tso
(74) Attorney, Agent, or Firm—Margaret A. Dobrowitsky (57) ABSTRACT

An apparatus and method for providing enhanced charging efficiency and a reduction in charge system cost when charging segmented batteries. A current switching device routes charging current from a charge source to a selected segment of the battery, while the remaining segments are in a relaxation mode and are not receiving charge current. A segment selection device periodically reconfigures the current switching device to route charging current to another segment of the battery. As a result, each of the series-connected cells of the battery are subject to alternating charging and relaxation periods until the battery has achieved a desired state of charge.

27 Claims, 6 Drawing Sheets

PSEUDO-PARALLEL CHARGING SYSTEMS AND METHODS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention pertains generally to battery charging systems, and more particularly to charging a series of battery cells as a collection of pseudo-parallel battery segments.

2. Description of the Background Art

The use of battery chargers for periodically recharging secondary energy cells such as rechargeable batteries, secondary batteries, battery packs, storage cells, or the like is well known. Certain applications, such as battery systems within electric vehicles, employ a long string of battery cells connected in series. These "long-string" battery systems are typically charged using a high-wattage charger which may be configured, for example, for constant-current/constant-voltage (CI/CV) charging.

Charging systems for long-string batteries suffer from a number of drawbacks and limitations however. In particular, a high-wattage charger system is required, and the cells of the battery are often subjected to substantial levels of both undercharging and overcharging which can lead to both lowered battery capacity and lowered battery life expectancy.

Accordingly, a need exists for a battery charger that allows for the efficient charging of batteries and battery systems which contain any number of cells. The present invention satisfies that need, as well as others, while overcoming the deficiencies of previous charging systems.

BRIEF SUMMARY OF THE INVENTION

The present invention provides for pseudo-parallel charging of a series of battery cells in a battery pack. The long series of cells within the battery pack, which may comprise cells within a single battery or series of separate batteries, are divided into segments which are charged as pseudo-parallel cells so that the battery pack can be charged at greater efficiency with a lower-cost charger.

The present invention takes an approach that is contrary to what is conventionally taught in regard to charge system design, which is to charge the entire string of cells as a single indivisible unit. Charging a battery as a single unit with a single charger is simple, and the charge rate is typically set at a constant current limited by an upper charge voltage. However, since the cells and/or battery segments can differ in their capability to accept a charge, the charger is always overcharging certain portions of the battery pack while undercharging other portions. For example, it is common for weak cells, that exhibit a high charge resistance, to prematurely arrive at the charge voltage limit with the result that the remaining cells are maintained in an undercharged state. Therefore, because some of the cells are undercharged or overcharged, a long-string battery pack suffers from diminished capacity or lowered useful life.

In contrast, the present invention provides for segments in a series of battery segments to be charged in an alternating manner, referred to herein as "pseudo-parallel" charging. The terms "segments" or "battery segments" generally will be used herein to refer to a portion of a series-connected set of battery cells to which conductive access is provided for the purpose of charging.

The use of pseudo-parallel charging provides a number of benefits. For example, the cost of a charging system is related to the maximum charge voltage and the amount of current to be supplied. Charging the segments of a battery individually lowers the maximum charge voltage requirement and consequently the required wattage of the charger and the associated circuit elements, such as high-current rectifiers. Furthermore, it has long been recognized that the charging efficiency of a battery charging system can be significantly enhanced by performing pulsed-current charging wherein high-current pulses are applied periodically to the battery. A description of pulsed-current charging methods may be found in an article by L. T. Lam et al. entitled "Pulsed-current Charging of Lead/acid Batteries - A Possible Means of Overcoming Premature Capacity Loss?" from the Journal of Power Sources, issue 53 pages 215–228, published 1995, which is incorporated herein by reference. Pulsed-current charging provides high-current charge pulses separated by short relaxation intervals, on the order of 10 to 500 milliseconds, during which charging current is interrupted so as to increase the electrochemical conversion rate and efficiency of the charged battery. Pseudo-parallel charging within the present invention extends the relaxation interval of pulse-charging for a first battery segment during which a second battery segment is pulse-charged. The relaxation interval may be extended for charging batteries of more than two segments.

An object of the invention is to increase charging efficiency within a battery comprising a series of cells and/or segments.

Another object of the invention is to lower the cost of charging systems on long-string batteries.

Another object of the invention is to provide compensation of physical differences between the battery segments within a long-string battery.

Another object of the invention is to reduce the amount of overcharging or undercharging to which cells of a battery pack are exposed.

Another object of the invention is to maximize the effect of pulse-current charging without lowering charging efficiency.

Another object of the invention is to allow the use of mixed chemistries within segments of a long-string battery.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

Figure 1:
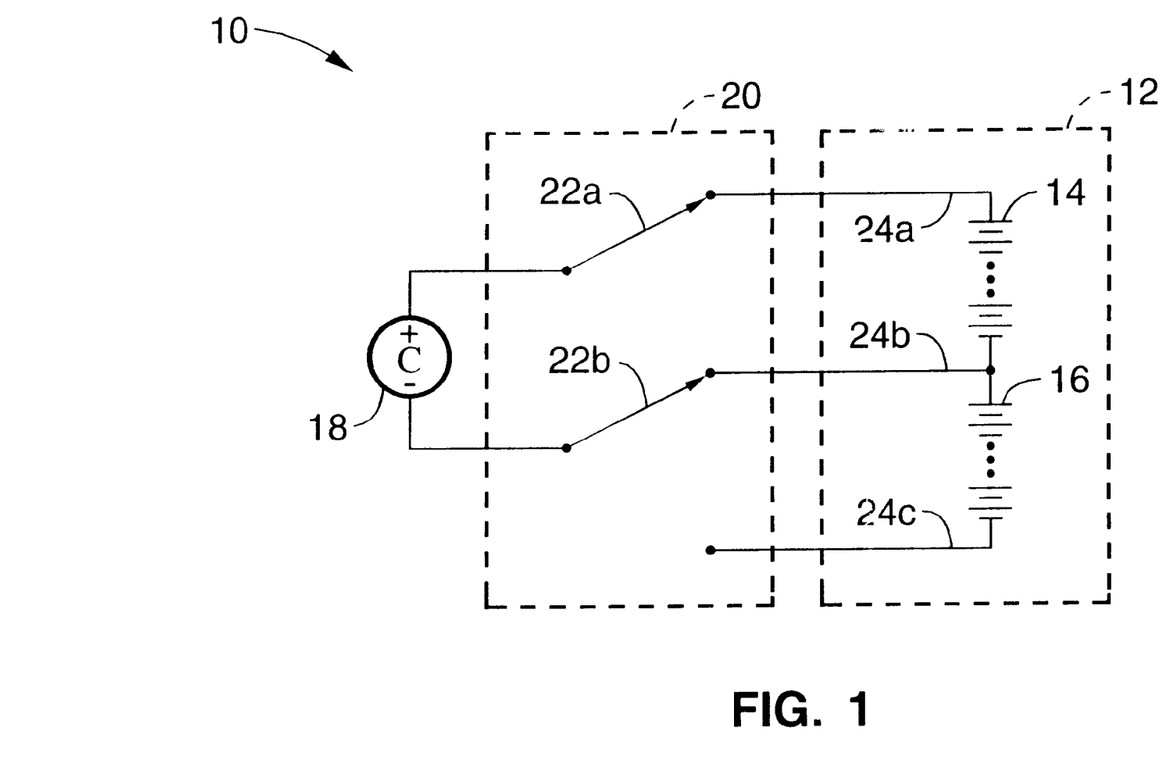
FIG. 1 is a simplified schematic of charge paths within a pseudo-parallel charging system according to the present invention shown charging a battery containing two segments.

FIG. 1 is a simple representation of the charge paths during pseudo-parallel charging 10, wherein a battery pack 12 comprises a first segment 14 and a second segment 16 that are connected to a charging source 18 by a pseudo-parallel charging controller 20. The charging source 18 and charging controller 20 are preferably controlled by a programmable circuit element. It will be appreciated that each segment of the battery pack contains at least one battery cell, and preferably numerous cells as is indicative of a long-string battery pack. The charging controller 20 provides switches 22a, 22b which allow for the charging of either the first battery segment 14 upon connection to leads 24a, 24b, or for charging the second battery segment 16 upon connection to leads 24b, 24c. Not shown in FIG. 1 are the timing, monitoring, and control circuitry within the pseudo-parallel charging system. The long-string battery pack 12 is charged one segment at a time, such that while one segment is being charged the other segment is disconnected from the charger in a relaxation mode. Battery pack 12 is being charged as a first segment 14 being "pseudo-parallel" with the second segment 16; these segments are considered "parallel" insofar as the battery voltage seen at the charger is that of a single segment while the charge current is flowing alternatively (ergo the prefix "pseudo-") to both of the battery segments. The charge source 18 can be provided by a charger with lower wattage than would be required for directly charging both segments simultaneously due to the aggregation of series voltage.

Figure 2:
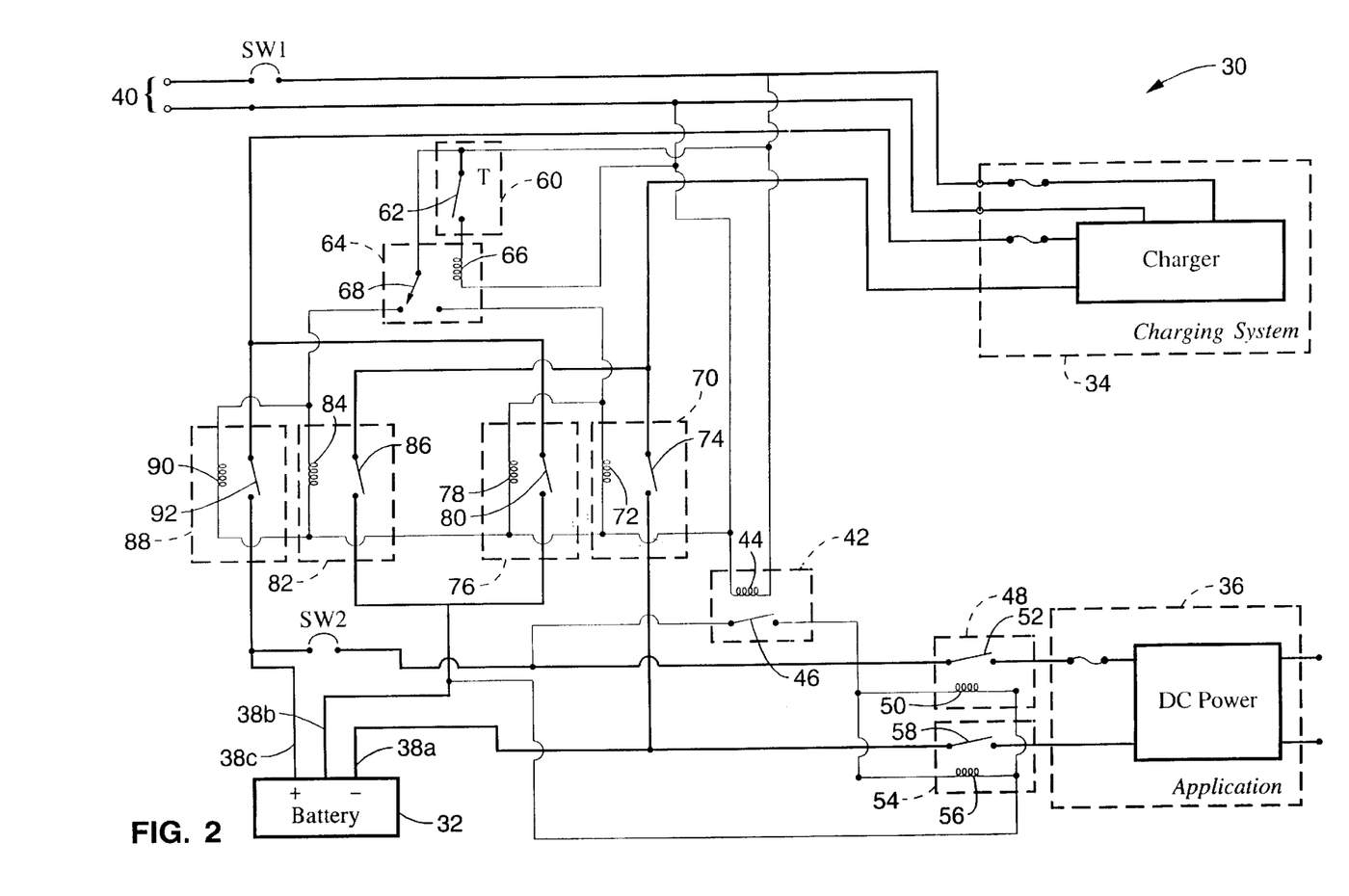
FIG. 2 is a schematic of a pseudo-parallel off-line charging system according to the present invention shown for charging a two segment battery.
Figure 3:
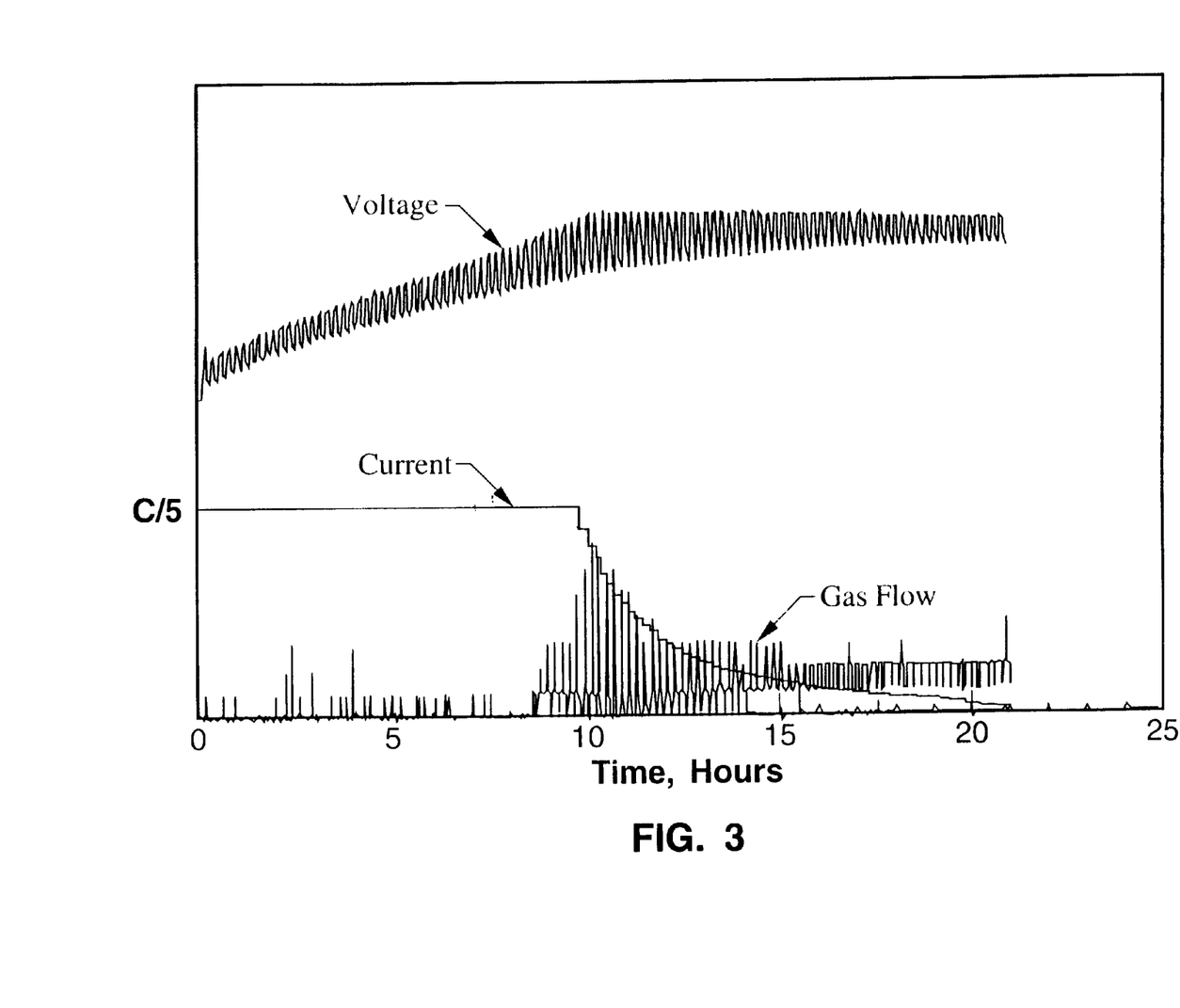
FIG. 3 is a graph of voltage and current charging profiles for the pseudo-parallel charging system of FIG. 2.

FIG. 2 exemplifies an embodiment of a pseudo-parallel charging controller 30 shown connected to a 24-volt valve-regulated lead-acid battery (VRLA) battery pack 32, charging system 34, and application load 36. The embodied circuit provides off-line charging of the battery, wherein the battery may be either supplying power to the application load, or have power supplied to it within a charging cycle in which the load is disconnected, or off-line. The circuit thereby exists in either a state of use, wherein the battery supplies power, or a charging state. An example of an off-line charging circuit can be found in the battery power generally provided within an electric vehicle. During use, the battery pack supplies power to the vehicle, and while parked, with a connection to a charging station, the battery pack is charged. When the charging connection 40 receives power from a charging station, a load disconnection relay 42 receives current through coil 44 which opens the normally-closed switch 46. Current from the battery pack 32 to the load 36 is thereby disrupted as current no longer flows through the coils 50, within relays 48, 54 and the normally-open switches 52, 58 return to an open circuit condition thereby taking the application load off-line. A segment of the battery pack is selected for charging by a timer 60 having a periodic output which toggles between two states; an current output state, and non-current output state. These two states are represented by the switch 62 which opens and closes periodically with a typical 50% duty cycle when power from the charging station is applied. Output current from the timer 60 drives the coil 66 of a segment selection relay 64, whose switch 68 routes current to either of two sets of relays. A first set of relays 70, 76 receive the current through coils 72, 78, which cause closure of normally-open switches 74, 80 to route charging current from the charging system 34 to the segment of the battery between leads 38a and 38b. A second set of relays 82, 88, can receive the current from relay 64 through coils 84, 90, which causes closure of the normally-open switches 86, 92 to thereby route charging current from the charging system 34 to the segment of the battery between leads 38b and 38c. It will be appreciated that upon application of power to the apparatus 30 by way of the charging connection 40 from the charging station, charging current will alternatively flow through each of the two segments within the battery pack, while the charging system 34 monitors and controls the charge process for each of the segments. The illustrated embodiment preferably charges each of the two 12-volt segments of the 24-volt VRLA battery pack with a conventional constant-current limited-voltage charger and with the pseudo-parallel circuitry utilizing five minute charge and relaxation intervals as set by timer 60. The circuit typically employs extended relaxation intervals for charging the batteries which would be in the range from 0.5 minutes to 30 minutes with 5 minutes being exemplified above. These extended intervals provide sufficient time for electrolytic equilibrium to be established. Battery systems having slow electrolyte or ion diffusion, such as immobilized electrolytic batteries (sealed type, VRLA) would generally employ relaxation intervals of at least several minutes. Furthermore, it should be appreciated that the use of long relaxation intervals may in many applications eliminate the necessity of employing more expensive switching power-supplies that provide quick on-off control of power (i.e. in the millisecond range), and consequently allow the use of low-cost linear power supplies. The measured current, voltage, and level of out-gassing during charging of a segment within battery pack 32 of FIG. 2 are illustrated within FIG. 3. It can be seen that the initial charge rate remained at C/5 for approximately ten hours as the charging voltage was rising. As the segment of the battery pack neared full charge, the charge current tapered off and full charge was reached at approximately twenty hours. The amount of out-gassing by the battery pack was significantly reduced although as expected the overall charge time was increased. It should be recognized that the two segments of the battery pack may exist at different charge state levels, and the charger may output different charge currents to each of the segments of the battery according to where the segment is in relation to the charging profiles.

Figure 4:
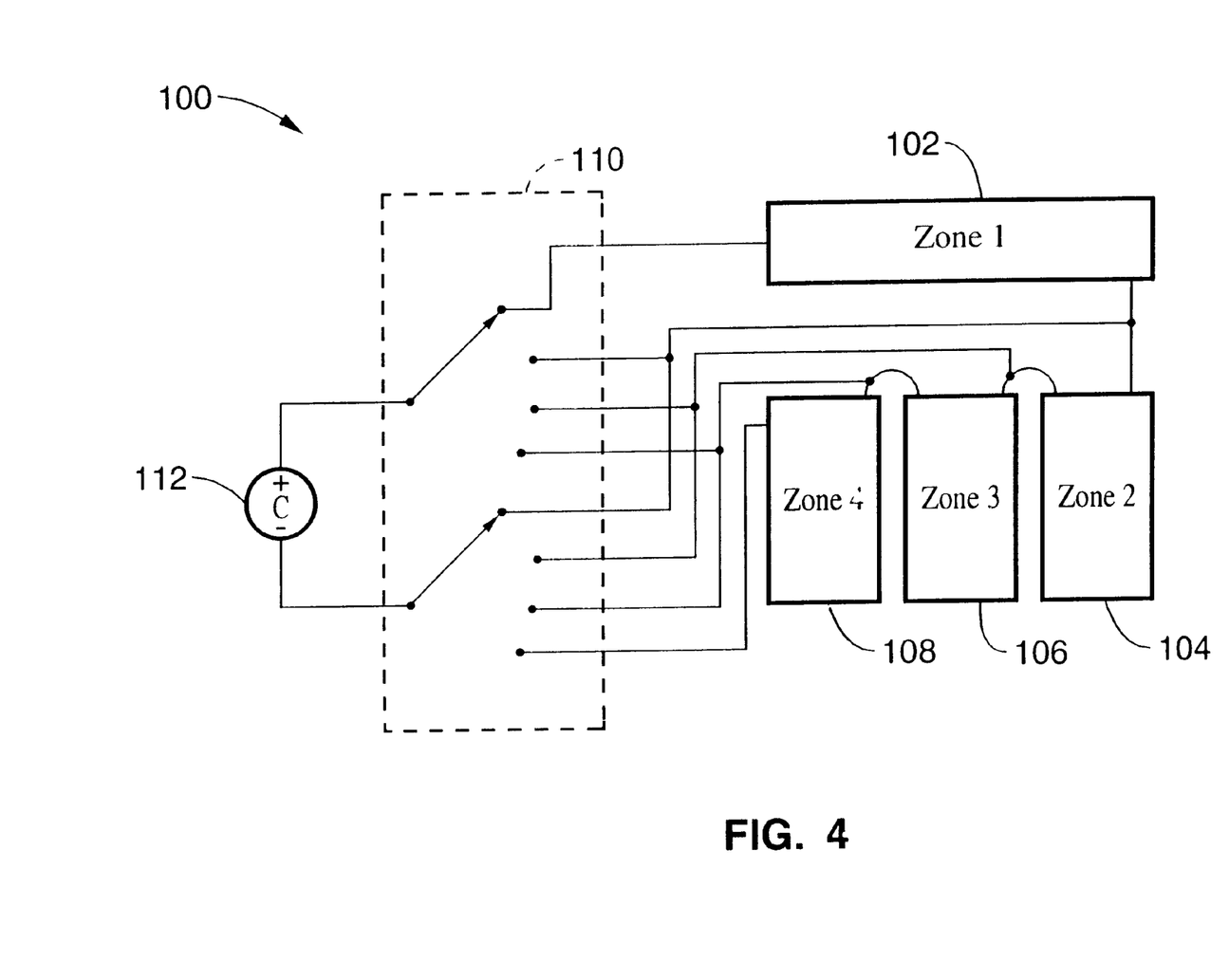
FIG. 4 is a simplified schematic of pseudo-parallel charging of four battery segments according to an aspect of the present invention which is adapted for charging batteries within various temperature zones.
Figure 5:
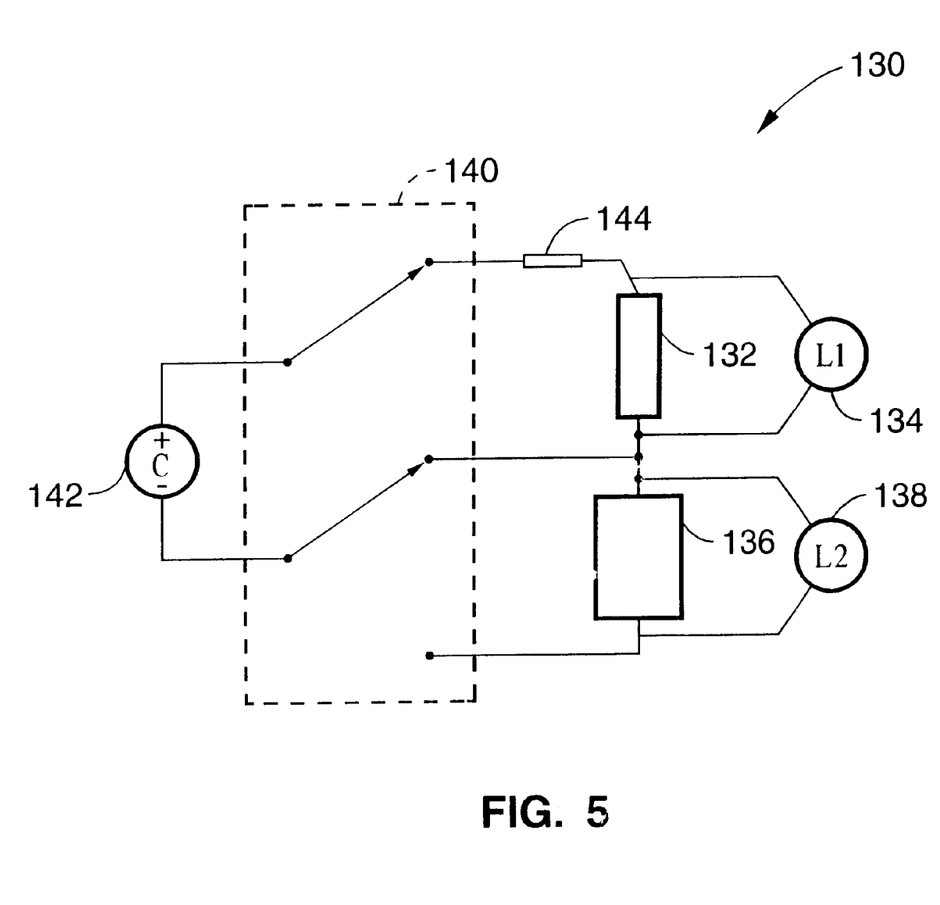
FIG. 5 is a simplified schematic of pseudo-parallel charging of two disparate battery segments according to an aspect of the present invention.
Figure 6:
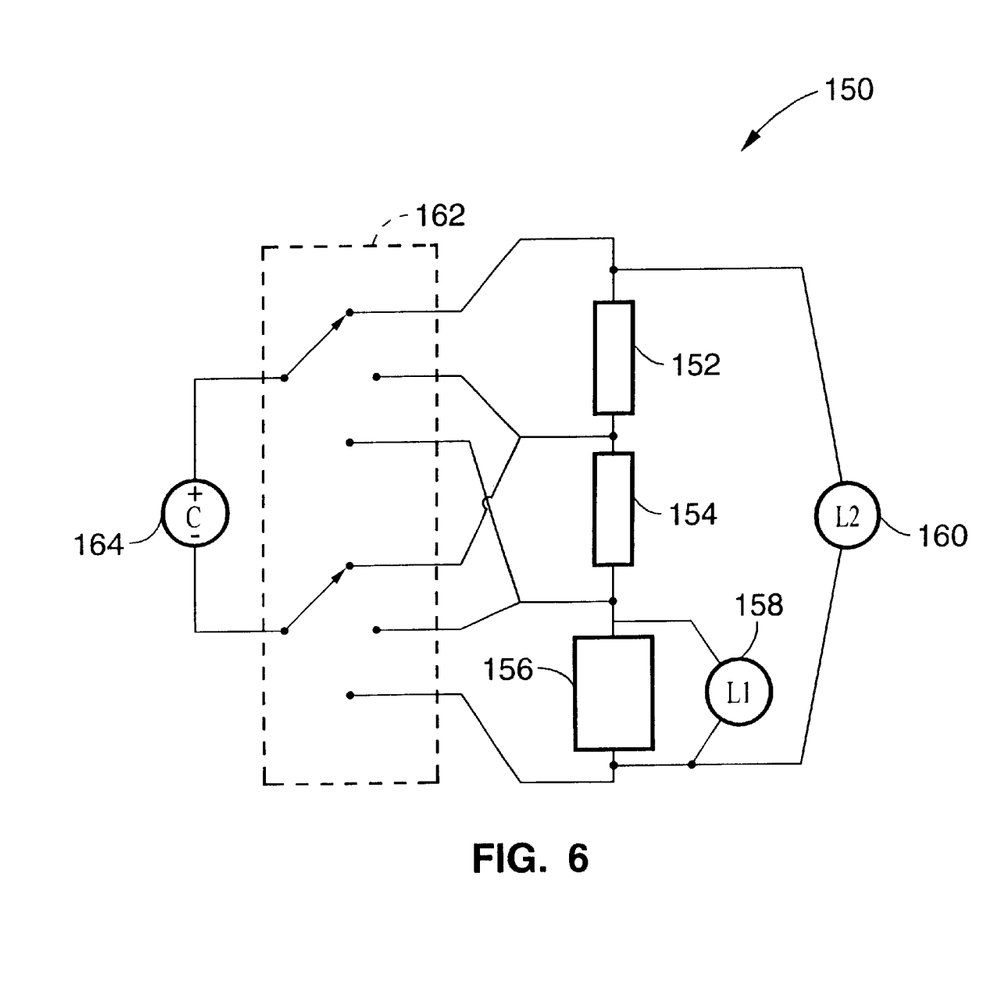
FIG. 6 is a simplified schematic of pseudo-parallel charging of three disparate battery segments whose overall open-cell output is 42-volts according to an aspect of the present invention.

In the preceding embodiment the charging of each segment was governed by the charger and the interval over which the charger was connected to each of the battery segments. The charge interval and rate of charge, however, can be adapted to allow the charging of battery segments that have or exhibit different characteristics which include battery capacity, battery chemistry, battery cell type, temperature exposures, battery age, battery abnormalities, and battery history. The teachings may be utilized with otherwise traditional forms of chargers or chargers which provide various intelligent battery control, such as those employing a "System-Management-Bus" (SMBus). FIG. 4 illustrates a four segment pseudo-parallel charging system 100 in which the long-string battery is retained within an area that has been apportioned by temperature into Zone One 102, Zone Two 104, Zone Three 106, and Zone Four 108. Within this temperature zone configuration, batteries maintained at higher temperatures will exhibit increased levels of charge acceptance. It should be appreciated, therefore, that if charger 112 were a typical charger which charges all four zones simultaneously as a single battery unit controlled by the average charge state of all zones combined, then some of the zones would be subject to overcharging and battery degradation while other zones would be subject to undercharging. The pseudo-parallel charging circuit 100 with current switching device 110 allows the charger 112 to separately charge each battery segment within each of the four temperature zones while concomitantly taking into account the temperature of the battery within that zone to provide increased charging effectiveness and reduced levels of out-gassing. FIG. 5 illustrates an embodiment 130 wherein two distinct batteries are interconnected, with a first battery 132 for supplying power to a first load 134, and a second battery 136, for supplying power to a second load 138. Often such batteries are charged in parallel whereas they share the current from the charger as determined by their size and state-of-charge, however, the smaller battery must be prevented from serious overcharging while the differences of full-charge equilibrium voltages can cause one of the batteries to draw an unwarranted majority of the charge current. Although subject to the problems already mentioned for series charging, the battery combination of FIG. 5 may be charged in series toward a cumulative voltage for the combined batteries. Sufficient charge voltage for these series connected batteries could be obtained by using a charging source with a higher output voltage or by using a DC/DC converter on the output of a charger configured for charging one of the batteries. In either the parallel or series charging schemes, the cells of the battery are subject to overcharging and undercharging which reduce operating efficiency and battery life. The pseudo-parallel current routing switches 140 in FIG. 5, allow both batteries to be charged by the single charger 142. A simple constant-current/constant-voltage (CI/CV) charger (i.e. 25A/15V) may be employed with the pseudo-parallel charge switching arrangement 140 to provide proper charging of each segment of the overall battery system. If the charger 142 is adapted to provide optimal charging of battery 136, then the smaller battery 132 may be subject to excessive charge current levels. The limiting resistor 144 on the smaller battery 132 is utilized to prevent excessive levels of charge current, and is selected having a resistance value for optimizing the charging voltage or upper voltage limit for the battery 132. Use of a limiting resistor within a predominantly voltage controlled charging circuit is often referred to as taper-charging, wherein charging current is a function of the voltage applied and the state-of-charge, or so-called "internal resistance" of the battery. By way of example, a dual-battery system can be utilized such that a larger battery 136 can provide power for engine cranking, while a smaller second battery 132 can provide power for vehicle accessories. Alternatively, the combined voltage from the first and second batteries 132 and 136 may be used for driving higher-voltage accessories. FIG. 6 illustrates still another embodiment of pseudo-parallel charging 150 in which three 12-volt battery segments 152, 154, and 156 are being charged by a single charger. The larger cell 156 can be used for a load 158 such as the starter and/or for driving 12-volt accessories, while the combined voltage of the three batteries, acting as segments of a single battery, provide an unloaded output of 42-volts which can be used to drive a load 160 which may comprise a number of vehicle electronic systems. It will be appreciated that the pseudo-parallel charger will provide proper charging of the battery combination even if the batteries within the combination are of different capacities and have a different state-of-charge level. The current routing mechanism 162 allows selection of each of the three segments for charging by the charger 164, which preferably is set to provide higher current and longer charge periods to the higher capacity battery 156, and may in-addition charge the segments based on their state-of-charge.

It will be appreciated that pseudo-parallel charging is applicable to a wide range of battery applications. Furthermore, pseudo-parallel charging is applicable to battery formation within a mass manufacturing facility, such that a group of batteries are charged and tested as a string of segments by a single charger/tester.

It will be appreciated that pseudo-parallel charging may be used with various charger varieties, and that pulsed-current chargers typically provide improved electrochemical conversion rates as they accelerate the mass-transport process (e.g. diffusion of ion species within the porous electrode). Furthermore, it has been shown that the use of pulsed-current charging can enhance the acid-penetration action (pickling) and subsequently improve the reaction efficiency and overall conversion within the charging battery. Combining pulsed-current charging with pseudo-parallel charging results in improved battery efficiencies, more complete utilization of charging resources, and a reduction in manufacturing costs.

Accordingly, it will be seen that this invention provides improved charging methods which are particularly well-suited for use with long-string battery packs. Different embodiments of the invention have been provided by way of example and not of limitation, as the inventive teachings may be practiced in a variety of ways which will be recognized by one of ordinary skill in the art. Specifically, it will be recognized that the relays described within the embodiments may be replaced by other forms of switching devices, such as FETs and solid-state switches. Additionally, more than one charging source may be used wherein multiple segments are charged simultaneously while remaining segments are in a relaxation mode. Furthermore, in certain applications it may be desirable to condition or test the cells during relaxation, although this adds a large complexity burden. The charging source used within the embodiments may comprise any of a number of present and proposed charging sources and need not be designed specifically for use with pseudo-parallel charging; however, a preferred charger can be integrated with the pseudo-parallel charging circuitry to provide enhanced capabilities, such as soft-start switching and identification of recharge characteristics within the segments of the battery. Additionally, the present invention may be employed within battery chargers and power-management systems which utilize smart battery control, such as provided by the "System-Management-Bus" (SMBus) which is currently being used extensively as an interface to facilitate smart-battery management.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for charging a battery pack having a plurality of battery segments, comprising:
    a power source; and
    means for applying a series of high-current charging pulses from said power source to a selected battery segment while the remaining battery segments are in a non-charging relaxation interval, and for cycling through said battery segments and periodically applying a pulsed charging current to each segment while the remaining segments are in a non-charging relaxation interval.

2. An apparatus as recited in claim 1, wherein each battery segment is charged as a function of a charge characteristic selected from the group consisting of time, type of battery, environment, battery temperature, rate of temperature increase, battery voltage, rate of charge, rate of charge acceptance, ohmic drop, battery capacity, and battery chemistry.

3. An apparatus as recited in claim 1, wherein the charging time and relaxation interval for each segment ranges from approximately 0.5 minutes to approximately 30 minutes.

4. An apparatus for charging a battery pack having a plurality of battery segments, comprising:
    means for selectably applying a pulsed charge current from a battery charger to a battery segment during a charging interval while the remaining battery segments are in a non-charging relaxation state; and
    means for periodically selecting a battery segment for charging such that each segment is subject to alternating periods of pulsed charging and relaxation until said battery system achieves a desired state of charge.

5. An apparatus as recited in claim 4, wherein each battery segment is charged as a function of a charge characteristic selected from the group consisting of time, type of battery, environment, battery temperature, rate of temperature increase, battery voltage, rate of charge, rate of charge acceptance, ohmic drop, battery capacity, and battery chemistry.

6. An apparatus as recited in claim 4, wherein the charging time and relaxation interval for each segment ranges from approximately 0.5 minutes to approximately 30 minutes.

7. In a battery charger which provides pulses of charging current to a battery pack containing a plurality of series connected battery segments, the improvement comprising:
    a switching circuit configured for connecting the charger to a portion of said battery segments for supplying charging current thereto, wherein the remaining battery segments are in a relaxation state in which they are not receiving charging current; and
    a segment selection circuit which periodically reconfigures said switching circuit to connect the charger to a different of said battery segments such that each of the battery segments is subjected to alternating charge and relaxation states until said battery pack achieves a desired state of charge.

8. An apparatus as recited in claim 7, wherein each battery segment is charged as a function of a charge characteristic selected from the group consisting of time, type of battery, environment, battery temperature, rate of temperature increase, battery voltage, rate of charge, rate of charge acceptance, ohmic drop, battery capacity, and battery chemistry.

9. An apparatus as recited in claim 7, wherein the charging time and relaxation interval for each segment ranges from approximately 0.5 minutes to approximately 30 minutes.

10. A method for charging a battery pack having a plurality of battery segments, comprising:
    applying pulses of charging current from a power source to a selected battery segment while the remaining battery segments are in a non-charging relaxation interval; and
    cycling through said battery segments and periodically applying said pulses of charging current to each segment while the remaining segments are in a non-charging relaxation interval.

11. A method as recited in claim 10, wherein each battery segment is charged as a function of a charge characteristic selected from the group consisting of time, type of battery, environment, battery temperature, rate of temperature increase, battery voltage, rate of charge, rate of charge acceptance, ohmic drop, battery capacity, and battery chemistry.

12. A method as recited in claim 10, wherein the charging time and relaxation interval for each segment ranges from approximately 0.5 minutes to approximately 30 minutes.

13. An apparatus as recited in claim 1, wherein said means comprises:
    a pulsed current charger adapted to apply high-current charge pulses separated by short relaxation intervals; and
    a charging controller having switches which are adapted to connect one of said batteries to said pulsed current charger, while the remaining batteries are retained in a relaxation interval.

14. An apparatus as recited in claim 13, wherein said relaxation intervals are on the order of from 10 to 500 milliseconds in length.

15. An apparatus as recited in claim 4, wherein said means comprises:
    a pulsed current charger adapted to apply high-current charge pulses separated by short relaxation intervals; and a charging controller having switches which are adapted to connect one of said battery segments to said pulsed current charger, while the remaining battery segments are retained in a relaxation mode.

16. An apparatus for charging multiple batteries having different charge capacities and which supply power to distinct loads, comprising:

a power source; and means for applying charging current from said power source to one of said batteries while the remaining batteries are retained in a non-charging relaxation interval, and for cycling through said batteries to periodically apply a charging current to each of said batteries.

17. An apparatus as recited in claim 16, further comprising at least one limiting resistor of a sufficient resistance value to prevent the application of excessive levels of charge current within batteries having lower charge capacity.

18. An apparatus as recited in claim 16, wherein said means comprises:

a charger; and a charging controller having switches adapted to connect one of said batteries to said charger, while the remaining batteries are retained in a relaxation interval.

19. An apparatus as recited in claim 18, wherein said charger comprises:

a pulsed current charger adapted to apply high-current charge pulses separated by short relaxation intervals.

20. An apparatus as recited in claim 19, wherein said relaxation intervals are on the order of from 10 to 500 milliseconds in length.

21. An apparatus for charging multiple battery segments, combinations of which are subject to different loads, comprising:

a power source; and means for applying charging current from said power source to a first battery while a second battery segment is retained in a non-charging relaxation interval, and for cycling through said batteries to periodically apply a charging current to each battery while the remaining battery is held in a non-charging relaxation interval.

22. An apparatus as recited in claim 21, wherein said means comprises:

a charger; and a charging controller having switches adapted to connect one of said batteries to said charger, while the remaining batteries are retained in a relaxation interval.

23. An apparatus as recited in claim 22, wherein said charger comprises:

a pulsed current charger adapted to apply high-current charge pulses separated by short relaxation intervals.

24. An apparatus for off-line charging of individual battery segments within a combination of battery segments, wherein the battery is taken off-line from the load during charging, comprising:

a load disconnection relay which is adapted to connect the combination of battery segments into an off-line mode, disconnected from said load, upon receipt of a sufficient voltage level when a connection to an external battery charger is established;

a switching device adapted for establishing electrical connections from said external battery charger to one battery segment within said combination of battery segments;

a charging timer connected to said switching device, to control the selective alternative establishment of electrical connections to each of said battery segments to said battery charger while the remaining battery segments are subject to a relaxation interval.

25. An apparatus as recited in claim 24, wherein said apparatus is configured for use with an external pulse current charging device for applying a series of high-current charge pulses separated by short relaxation intervals.

26. An apparatus as recited in claim 24, wherein said charging timer is configured to provide extended relaxation intervals for said battery segments in the range from approximately 0.5 minutes up to 30 minutes.

27. An apparatus as recited in claim 26, wherein said apparatus is adapted for charging valve-regulated lead-acid battery (VRLA) segments.

* * * * *